US006772557B2

(12) United States Patent
Laskey et al.

(10) Patent No.: US 6,772,557 B2
(45) Date of Patent: Aug. 10, 2004

(54) TERMITE BAIT CARTRIDGE HAVING CHANNELING FEATURES

(75) Inventors: Justin T. Laskey, Chapel Hill, NC (US); Alec Alexiades, Cary, NC (US); Daniel O'Byrne, Apex, NC (US); Clark D. Klein, Pittsboro, NC (US); David Davies, Raleigh, NC (US)

(73) Assignee: BASF Corporation, Mount Olive, NJ (US)

( * ) Notice: Subject to any disclaimer, the term of this patent is extended or adjusted under 35 U.S.C. 154(b) by 0 days.

(21) Appl. No.: 10/292,364

(22) Filed: Nov. 11, 2002

(65) Prior Publication Data

US 2004/0088904 A1 May 13, 2004

(51) Int. Cl.[7] .............................................. A01M 13/00
(52) U.S. Cl. ...................................................... 43/124
(58) Field of Search ........................ 43/124, 131, 132.1

(56) References Cited

U.S. PATENT DOCUMENTS

| 5,769,107 A | 6/1998 | Woodruff |
| 5,901,496 A | 5/1999 | Woodruff |
| 6,003,266 A | 12/1999 | Woodruff |
| 6,065,241 A | 5/2000 | Woodruff |
| 6,370,812 B1 | * 4/2002 | Burns et al. .................. 43/124 |
| 2002/0023382 A1 | 2/2002 | Snell et al |

FOREIGN PATENT DOCUMENTS

WO          WO 02/32223 A1      4/2002

OTHER PUBLICATIONS

International Search Report for PCT Application PCT/EP03/00348, completed Jun. 17, 2003.

* cited by examiner

Primary Examiner—Peter M. Poon
Assistant Examiner—Bethany L. Griles
(74) Attorney, Agent, or Firm—Alston & Bird LLP

(57) ABSTRACT

A termite bait station for installation in the ground includes a tubular outer housing and a tubular inner bait cartridge inserted into the housing, each having circumferentially elongate apertures therethrough to allow termites to access bait in the cartridge. Each aperture in the cartridge is disposed between a pair of spaced, parallel ribs that extend in the circumferential direction. The ribs reduce the radial gap that must be traversed by a termite passing from the outer housing to the bait cartridge. The ribs also form circumferentially extending channels for producing a channeling effect tending to lead termites into the apertures in the cartridge.

29 Claims, 2 Drawing Sheets

TERMITE BAIT CARTRIDGE HAVING CHANNELING FEATURES

FIELD OF THE INVENTION

The present invention relates to in-ground termite bait stations for containing termite-edible bait material to monitor and/or control termite activity.

BACKGROUND OF THE INVENTION

Various types of in-ground bait stations have been developed for monitoring and/or controlling termite activity. One known type of station includes a tubular outer housing that is implanted in the ground with an upper end of the housing substantially flush with the ground level. A tubular bait cartridge containing a quantity of bait material (with or without any toxic active ingredient) is inserted into the outer housing. The housing and the cartridge have openings that allow subterranean termites to access the bait material in the cartridge. Known bait stations have included provisions for assuring that the openings in the outer housing and bait cartridge are aligned when the cartridge is installed in the housing. Subterranean termites that discover the bait material in the bait station will build tunnels leading to openings in the outer housing, and will use soil to construct tubes leading from the openings in the outer housing to the aligned openings in the bait cartridge. The termites are then able to access the bait in the cartridge via the tubes.

These tubes are broken when the bait cartridge is removed from the outer housing during periodic checks of the bait station for monitoring the termite activity at the station. After the cartridge is replaced, termites must rebuild the tubes from the outer housing to the bait cartridge before the termites can again begin accessing the bait in the cartridge. The disruption of the tubes tends to disrupt the pheromone trails that termites create to guide other termites to the bait. Until the tubes are rebuilt, termites will tend not to begin feeding on the bait in substantial numbers.

U.S. Pat. No. 5,901,496, incorporated herein by reference, discloses a termite bait station that addresses the above issues by providing a boss around each opening in the bait cartridge. The boss surrounds the opening on all sides and extends radially outward toward the inner surface of the outer housing so as to reduce the radial gap between the cartridge and the housing that must be traversed by termites. To assure proper alignment of the openings in the cartridge and housing, the cartridge has a lead thread or projection that engages a circumferentially extending groove in the outer housing; the cartridge is rotated in a predetermined direction relative to the outer housing until the projection abuts the end of the groove, which establishes the proper aligned relation between the openings.

SUMMARY OF THE INVENTION

The present invention improves upon the technology represented by the '496 patent described above, by providing a bait cartridge configuration that does not rely on or require any particular rotational orientation of the cartridge relative to the outer housing. The outer housing need not be specially adapted to position the cartridge in a particular rotational orientation, and consequently the cartridge can be used with various outer housing configurations. At the same time, the cartridge includes features for reducing the radial gap between the cartridge and housing and for channeling termites into the openings in the cartridge.

In accordance with the invention, a bait cartridge comprises a tubular side wall extending from a lower end to an upper end thereof, a bottom wall joined to the lower end of the tubular side wall to close the lower end, and a plurality of circumferentially elongate apertures formed through the tubular side wall to allow termites to access an interior of the bait cartridge; each aperture has an upper edge, a lower edge, and two opposite end edges. A circumferentially extending upper rib protrudes from the upper edge of each aperture radially outwardly beyond an outer surface of the tubular side wall, and a circumferentially extending lower rib protrudes from the lower edge of each aperture radially outwardly beyond the outer surface of the tubular side wall. The ribs reduce the radial gap that must be traversed by a termite passing from the outer housing to the bait cartridge. The ribs also form circumferentially extending channels for producing a channeling effect tending to lead termites into the apertures in the cartridge. Significantly, the end edges of the apertures are free of any radially outward protrusions so as not to disrupt the channeling effect of the ribs. Thus, regardless of where on the cartridge a termite first makes contact with the cartridge, the termite will tend to be channeled by the ribs into an aperture and thus will be led to the bait. Accordingly, even if the apertures in the cartridge are only partially aligned with the openings in the outer housing, termites will still be channeled to the apertures in the cartridge.

The cartridge preferably has a plurality of longitudinally extending rows of the apertures, the rows being spaced about the circumference of the cartridge. Each row has a plurality of apertures spaced apart along the length of the cartridge. To allow termites to enter the cartridge while preventing larger pests from entering, the apertures preferably have a width of about 2–3 mm.

Preferably the apertures around the circumference collectively take up a majority of the circumference, with relatively narrow spaces between adjacent apertures in the circumferential direction; in this manner, when the outer housing likewise has openings appropriately distributed about its circumference, the apertures will be at least partially aligned with openings in the housing for any rotational orientation of the cartridge. In a preferred embodiment of the invention, each aperture has a circumferential length of about 25 mm and there are four rows of the apertures about the circumference. The cartridge has a diameter of about 35–40 mm. Thus, the apertures collectively have a circumferential extent of about 100 mm, out of a total circumference of about 110 to 125 mm.

The cartridge preferably includes a viewing window in its tubular side wall for monitoring how much bait material remains in the cartridge. The cartridge in a preferred embodiment is constructed of a substantially transparent material, and the window comprises a solid portion of the side wall having no apertures. The solid portion preferably is provided with a smoother surface finish than the rest of the cartridge to enhance its transparency.

In a termite bait device comprising the bait cartridge in combination with a tubular outer housing, the outer housing includes a plurality of openings located so as to be at least partially aligned with apertures in the cartridge when the cartridge is installed in the housing. When the cartridge includes four rows of apertures as described, the housing preferably also includes four rows of openings; the openings in each row are longitudinally spaced at a center-to-center distance corresponding to that of the apertures in the cartridge. Preferably the apertures in the cartridge and the openings in the housing are circumferentially elongate; for example, in one embodiment, the apertures are about 25 mm long and the openings are about 20 mm long in the circumferential direction. The largest circumferential spacing between adjacent openings in the housing preferably is about 25–30 mm, while the largest spacing between adjacent apertures in the cartridge is about 5 mm. Accordingly, in any rotational orientation of the cartridge relative to the housing, the apertures are always at least partially aligned with the openings. The ribs then channel termites into the apertures even if a termite first contacts the cartridge at a location between adjacent apertures.

The outer housing and cartridge preferably have bottom walls that close the lower ends of their tubular side walls. The bottom walls preferably have drainage holes to allow excess moisture to drain from the bait station. The upper end of the cartridge preferably is closed by a removable cap. The cap and cartridge preferably have cooperative locking features that engage each other to retain the cap in place.

The upper end of the housing preferably is closed by a removable cover. The cover and tubular side wall of the housing have cooperative locking features that engage each other to retain the cover in place preventing access to the cartridge. The locking features of the housing preferably are such as to enable the cover to be locked in place by twisting the cover in one direction relative to the housing, and to be unlocked by twisting the cover in the opposite direction. The housing preferably includes an annular flange extending radially outwardly from its upper end, and the cover preferably lies substantially flat against the upper surface of the flange when locked in place. The cover preferably has no projections that can be grasped for twisting it, thereby deterring unwanted access to the interior of the housing by persons or animals. A recess or slot is provided in the cover, into which a tool can be inserted to twist the cover open.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
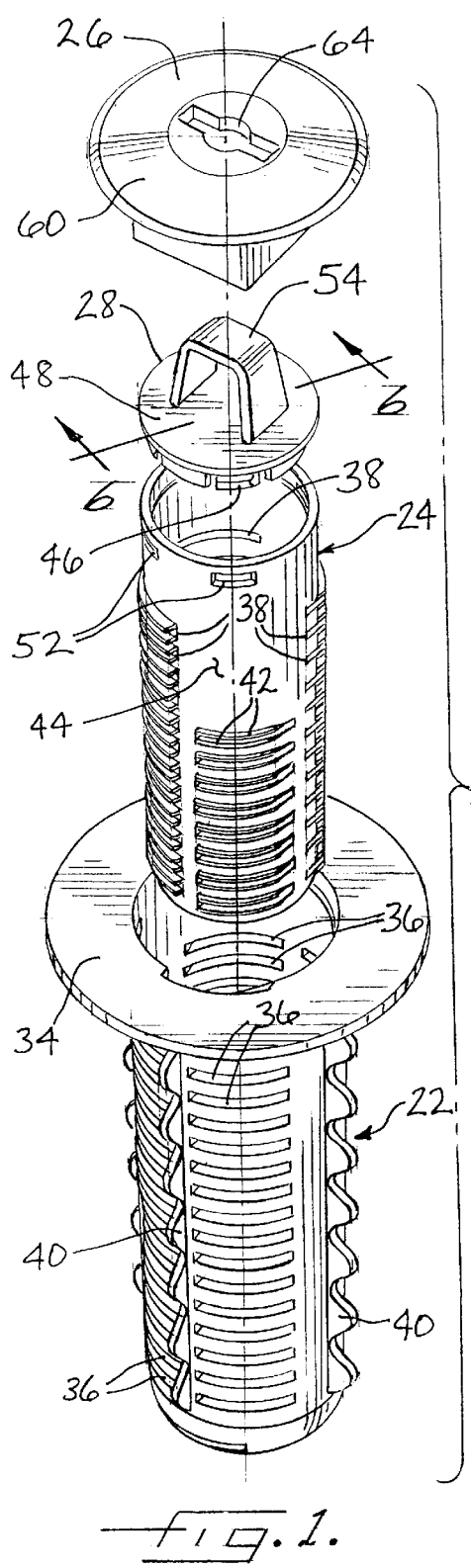
FIG. 1 is an exploded perspective view of a termite bait station for monitoring and/or controlling termite activity in accordance with one preferred embodiment of the invention.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

With reference to the figures, a termite bait station 20 for monitoring and/or controlling termite activity is depicted in accordance with one embodiment of the invention. The bait station comprises a tubular outer housing 22 and a tubular inner bait cartridge 24 sized to readily slide into and out of the outer housing while fitting relatively closely therein. The outer housing 22 has an open top end and includes a removable and replaceable cover 26 for closing the open top end. The bait cartridge 24 likewise has an open top end and includes a removable and replaceable cap 28 for closing the open top end. The bottom end of the outer housing is closed by a bottom wall 30, and similarly the bait cartridge's bottom end is closed by a bottom wall 32. The bottom walls 30, 32 preferably include drainage holes (only one shown, in wall 30) to allow excess water to drain from the bait station.

The outer housing 22 includes a radially outwardly extending flange 34. In use, a hole corresponding in diameter to that of the tubular portion of the housing 22 is dug or bored in the ground, and the housing 22 is inserted into the hole until the flange 34 abuts the upper surface of the ground. To load the bait station with bait, the bait is placed into the bait cartridge 24 and the cap 28 is replaced to close the top of the cartridge, the cartridge is slid into the outer housing 22, and the cover 26 is replaced on the outer housing.

Figure 3:
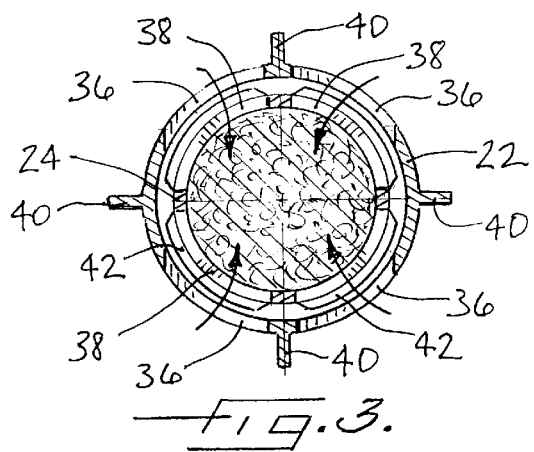
FIG. 3 is a cross-sectional view taken on line 3—3 of FIG. 2.

The outer housing and bait cartridge include openings or apertures that allow subterranean termites to pass through the openings or apertures to access the bait in the cartridge. More particularly, the outer housing includes a plurality of circumferentially elongate openings 36 through the tubular side wall of the outer housing. The openings 36 are spaced apart longitudinally along the outer housing, and preferably are arranged in a plurality of longitudinally extending rows that are spaced circumferentially about the tubular side wall, as shown. In the illustrated embodiment, there are four rows of the openings 36 spaced about the circumference. The rows are arranged in two pairs, with the rows of each pair being closely adjacent each other but spaced a greater distance from the rows of the other pair, as best seen in FIG. 3. However, it will be understood that this particular arrangement of the openings 36 is just one example of a suitable arrangement, and other arrangements can be used instead.

Figure 4:
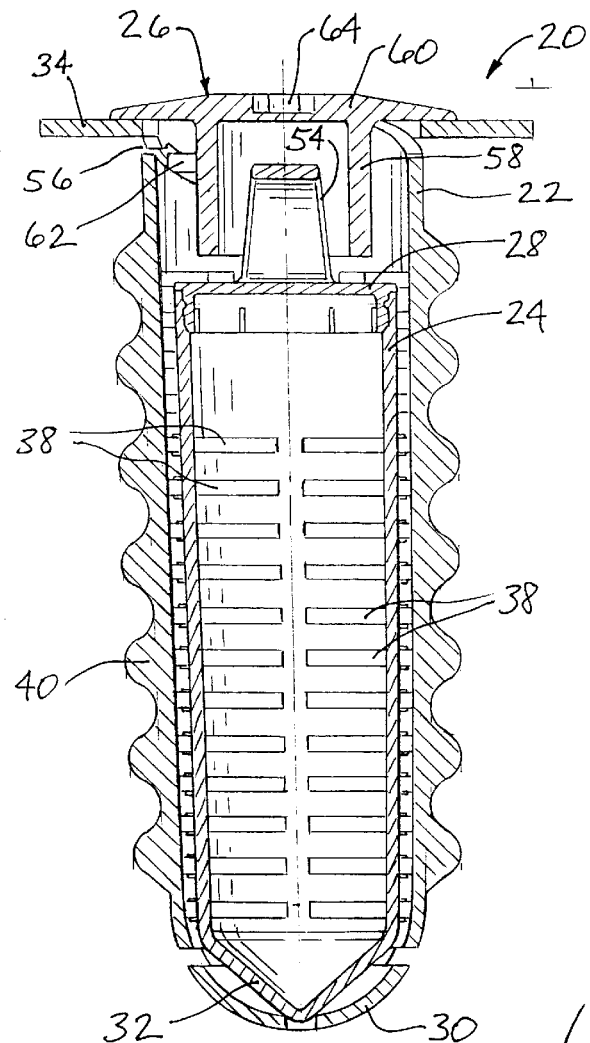
FIG. 4 is a cross-sectional view taken on line 4—4 of FIG. 2.

The bait cartridge 24 includes a plurality of circumferentially elongate apertures 38 through the tubular side wall of the cartridge. The apertures 38 are spaced apart in the longitudinal direction, and preferably are arranged in a plurality of longitudinally extending rows that are circumferentially spaced about the circumference of the cartridge, as shown. In the illustrated embodiment, there are four rows of the apertures 38 spaced substantially uniformly about the circumference. The apertures 38 are located longitudinally on the bait cartridge so that when the cartridge is fully inserted into the outer housing as shown in FIG. 4, the apertures 38 are longitudinally aligned with the openings 36 in the outer housing.

Figure 7:
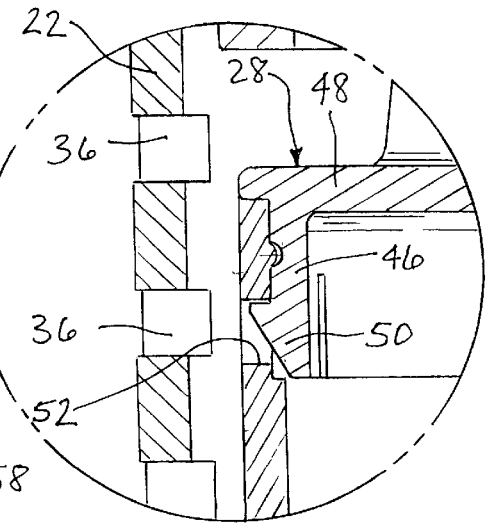
FIG. 7 is an enlarged view of the region indicated in FIG. 6.

The openings 36 in the outer housing 22 and the apertures 38 in the bait cartridge 24 are so dimensioned and arranged that in any rotational orientation of the bait cartridge relative to the outer housing, there are at least some apertures 38 that are at least partially aligned with at least some openings 36. Preferably, every aperture 38 is at least partially aligned with a corresponding opening 36. There may be some openings 36 that do not have corresponding apertures 38 aligned with them; for example, the openings 36 may extend all the way to the area of the cap 28 of the bait cartridge as best seen in FIG. 7.

As an illustrative example of dimensions for the outer housing and bait cartridge and their respective openings and apertures, the outer housing can have an outer diameter of about 40 to 50 mm (and can taper from a larger diameter at its top end to a smaller diameter at its bottom end), a wall thickness of about 2.5 mm, and a length from the top of the flange 34 to the bottom of the bottom wall 30 of about 17 cm. The openings 36 in the outer housing can each have a circumferential length of about 20 to 25 mm and a width in the longitudinal direction of about 3 mm. The openings 36 can be longitudinally spaced about 7 to 8 mm on center. As noted, the openings 36 can be arranged in two pairs of longitudinal rows, with the rows of each pair being closely adjacent (e.g., about 3 mm apart) and spaced from the rows of the other pair by a circumferential distance of about 25 mm. Between adjacent rows of openings 36, the outer housing can include a radially outwardly extending longitudinal rib 40 extending along a major fraction of the total length of the outer housing; thus, in the illustrated embodiment there are four of the ribs 40 spaced 90° apart. The ribs serve to stiffen the outer housing in bending and also tend to prevent the outer housing from being rotated in the ground.

The bait cartridge 24 can have an outer diameter of about 35 to 40 mm and a length from the top end of the tubular side wall to the bottom of the bottom wall 32 of about 13.5 cm. The apertures 38 can have a circumferential length of about 25 mm and a width in the longitudinal direction of about 2 to 3 mm. There are four rows of the apertures spaced about the circumference, and thus the apertures collectively have a circumferential extent of about 100 mm, out of a total circumference of about 110 to 125 mm for the cartridge. The apertures can be longitudinally spaced apart about 7 to 8 mm on center, corresponding to the spacing of the openings in the outer housing. As noted, the apertures 38 can be substantially equally spaced about the circumference of the bait cartridge. The bait cartridge preferably is formed of food-grade polyethylene (i.e., polyethylene certified by the U.S. Food and Drug Administration for use in food packaging and the like) to minimize the likelihood of termites, which are highly chemophobic, being repelled by the cartridge and thus not taking the bait.

The number of openings 36 and apertures 38 in each longitudinal row thereof can be selected as desired. In a preferred embodiment, each row of openings 36 in the outer housing has 15 openings; three of the rows of apertures 38 in the bait cartridge have 12 apertures, and the fourth row has only 8 apertures for reasons explained below.

Figure 5:
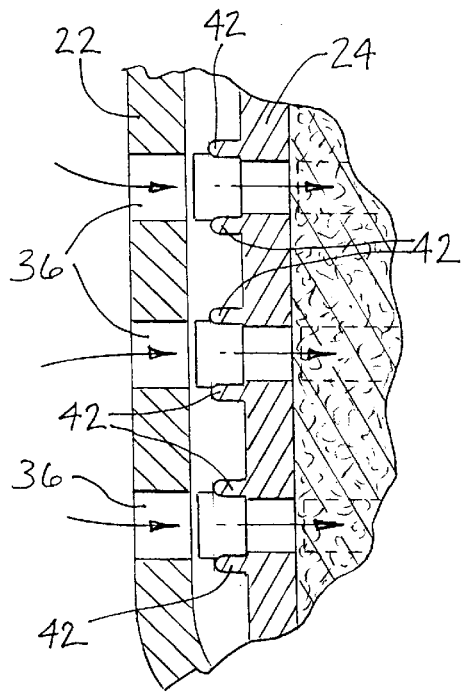
FIG. 5 is a cross-sectional view taken on line 5—5 of FIG. 2.
Figure 6:
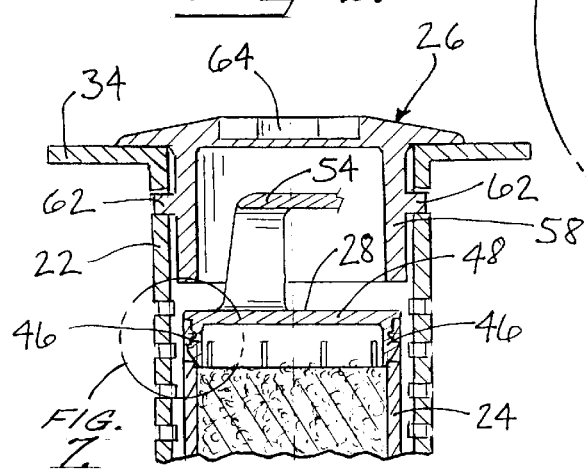
FIG. 6 is a cross-sectional view taken on line 6—6 of FIG. 1 with the bait station in its assembled condition.

In accordance with the invention, the bait cartridge 24 has features designed to channel termites into the apertures 38 and to form a bridge between the outer housing and the bait cartridge at each aperture. More specifically, each aperture 38 is positioned between a pair of longitudinally spaced, parallel ribs 42 that extend radially outwardly beyond the cylindrical outer surface of the bait cartridge. The ribs 42 extend circumferentially for substantially the full length of the corresponding aperture 38. The ribs of each pair are longitudinally spaced apart a distance of about 2 to 3 mm, substantially corresponding to the width of the aperture; thus, one rib projects outwardly from the upper edge of the aperture and the other rib projects outwardly from the lower edge of the aperture. The ribs preferably have a radial extent of about 2 mm, although the radial extent can be varied as needed. The ribs 42 reduce the extent of the radial gap between the bait cartridge 24 and the outer housing 22 that termites must cross to reach the bait cartridge, as best seen in FIG. 5. Thus, the ribs 42 are somewhat similar to the boss surrounding each aperture in the bait cartridge of U.S. Pat. No. 5,901,496, as previously described. However, the bosses in the '496 patent extend along all four sides of the rectangular apertures in the bait cartridge.

In contrast to the bosses in the '496 patent, the present invention employs the ribs 42 that extend along only two sides of the apertures; the other two sides of the apertures (i.e., the sides at the opposite ends of the apertures) are free of any radially outward protrusions. This is significant because it allows the ribs 42 to serve a channeling function, and also means that the bait cartridge need not be in any particular rotational orientation relative to the outer housing. More particularly, it is well known that termites will tend to follow channels in preference to straying outside the channels. By "channel" is meant an enclosed or partially enclosed space defined between at least two elongate parallel walls that are spaced apart by a distance not greatly exceeding the width of the termite's body. The ribs 42 thus tend to cause termites to follow the channel defined between the ribs. Accordingly, when a termite encounters the ribs 42, which is the first part of the bait cartridge that the termite will encounter after passing through one of the openings 36 in the outer housing, the termite will tend to follow the channel between the ribs 42 and thus will be led into and through the aperture 38 in the bait cartridge to the bait held therein.

Furthermore, as noted, the apertures 38 are sized and arranged in relation to the openings 36 in the outer housing so that in any rotational orientation of the bait cartridge each aperture and its associated ribs will be at least partially aligned with an opening 36. Accordingly, even if the apertures 38 and their associated ribs 42 are not fully aligned with the openings 36, the termite will still tend to encounter the ribs 42 first and will tend to be channeled by the ribs into the apertures located between the ribs. The ribs thus improve the chances that termites will find the bait.

Additionally, since the ribs reduce the gap between the bait cartridge and the outer housing, there is a smaller distance across which termites must build mud tubes or tunnels to reach the bait cartridge. As a result, when the bait cartridge is removed for periodic monitoring or refilling with bait material and the mud tubes between the housing and the cartridge are thus broken, termites are able to rebuild the mud tubes more quickly and thereby begin feeding on the bait again sooner.

When the bait cartridge 24 has been installed in the housing 22 in the ground for a substantial period of time, and particularly when termites have built mud tubes to the cartridge, the cartridge tends to become covered with mud or dirt and thus it can be difficult to see through the cartridge, even when the cartridge is formed of a material that is transparent or translucent, to determine the amount of bait material in the cartridge without removing the cap 28. To address this problem, the cartridge preferably includes a viewing window 44 (FIG. 1) comprising a region of the tubular side wall of the cartridge that does not include any apertures. Mud can easily be wiped off the window to allow viewing into the cartridge for determining how much bait has been consumed and how much remains. The window 44 can be polished to a smoother surface finish than the rest of the cartridge so as to improve the transparency of the window and facilitate wiping the window clean. By virtue of the viewing window 44, the cap 28 need be removed from the cartridge only when it is necessary to refill the cartridge.

The cap 28 preferably locks onto the bait cartridge in a manner tending to resist removal of the cap. More particularly, as best illustrated in FIG. 7, the cap 28 preferably includes a plurality of locking members in the form of resiliently deformable fingers 46 that project longitudinally downward from the outer periphery of a disk-shaped upper wall 48 of the cap. The fingers 46 are circumferentially spaced apart about the periphery of the upper wall 48 of the cap; preferably there are at least three fingers, but a greater number can be provided. The lower end of each finger 46 is formed as a generally barbshaped member wherein the barb 50 projects radially outwardly relative to the longitudinal central axis of the cap. The barbs 50 in the undeformed condition of the fingers 46 project out to a slightly larger diameter than the inner diameter of the bait cartridge. The upper end of the tubular bait cartridge 24 includes complementary locking members in the form of a plurality of detents or openings 52 (FIG. 7) configured and located so as to be engaged by the barbs 50 of the fingers 46. Thus, the cap 28 is pressed into the open top end of the bait cartridge, which pushes the fingers radially inwardly until the barbs 50 are urged into the openings 52 by the restoring force of the deformed fingers. The barbs 50 tend to lock in the openings 52 by virtue of their shape, so that pulling longitudinally upward on the cap 28 will tend not to dislodge the barbs from the openings, and the cap thus tends to remain engaged in the bait cartridge. To remove the cap, the barbs on at least some of the fingers 46 are pressed radially inwardly by inserting a suitable implement through the openings 52 in the bait cartridge so as to allow the barbs to clear the edges of the openings 52, while simultaneously pulling upward on the cap. The cap includes a handle 54 to facilitate removing the cap.

Figure 2:
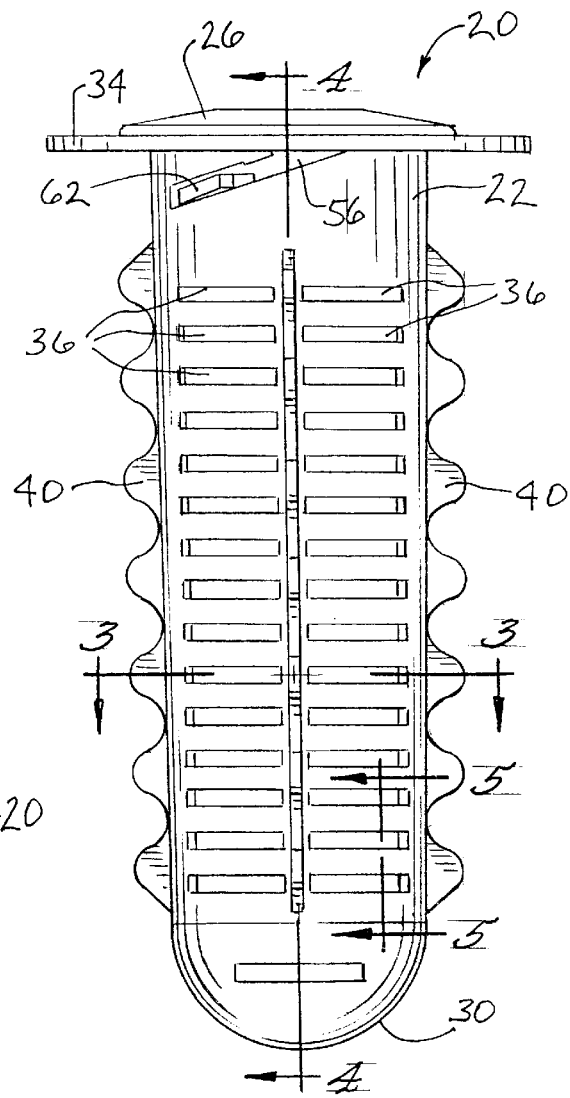
FIG. 2 is an elevation of the termite bait station in its assembled condition.

The outer housing 22 and its cover 26 preferably also include complementary locking members that engage each other to tend to resist removal of the cover. More specifically, the upper end of the tubular outer housing includes a pair of slots 56 (FIGS. 2 and 4) each of which extends in a generally helical direction along the housing, the slots being generally diametrically opposite each other. The cover 26 includes a square tube section 58 depending from the disk-shaped top wall 60 of the cover. A pair of locking lugs 62 (FIGS. 2, 4, and 5) project radially outward from the square tube section 58 for engaging the slots 56 in the outer housing. To lock the cover on the outer housing, the cover is positioned so the locking lugs 62 engage the upper ends of the slots 56 and the cover is twisted to cause the lugs to ride along the slots. The slots and lugs are preferably configured so that twisting the cover causes the lugs to frictionally engage the sides of the slots with progressively greater force as the cover is twisted further. Additionally, to further prevent unwanted removal of the cover, the top wall 60 of the cover preferably has no protrusions or projections that could readily be grasped to assist in twisting the cover off. Instead, the top wall includes a specially shaped slot 64 into which a special tool can be inserted to facilitate twisting the cover on and off. More particularly, the slot 64 has a circular center portion that is larger in diameter than most commonly available screwdriver blades, and a rectangular portion that extends radially outward from the center portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device for monitoring and/or controlling termite activity, comprising:
    a tubular outer housing adapted to be implanted in the ground, the outer housing having an upper open end and having a plurality of circumferentially elongate openings through a tubular side wall of the outer housing for passage of termites through the openings into an interior of the outer housing;
    a tubular bait cartridge slidably insertable into and removable from the outer housing via the upper open end thereof, the bait cartridge adapted to contain a quantity of termite-edible material therein, the bait cartridge having a plurality of circumferentially elongate apertures through a tubular side wall of the bait cartridge for passage of termites through the apertures, at least some of the apertures being at least partially aligned with at least some of the openings in the outer housing when the bait cartridge is installed in the outer housing so that termites can access the termite-edible material by passing through the openings and the apertures; and
    each circumferentially elongate aperture in the bait cartridge being disposed between an opposed pair of longitudinally spaced, circumferentially extending ribs that protrude radially outwardly beyond a tubular outer surface of the bait cartridge toward an inner surface of the outer housing for reducing a gap that must be traversed by a termite passing from the outer housing to the bait cartridge, each opposed pair of ribs forming a circumferentially extending channel open at opposite ends of the channel even when the ribs abut the inner surface of the outer housing, whereby termites are circumferentially guided by the channels into the associated apertures in the bait cartridge.

2. The device of claim 1, wherein the bait cartridge includes a plurality of the apertures longitudinally spaced apart along the bait cartridge and the outer housing includes a plurality of the openings longitudinally spaced apart along the outer housing, and wherein the apertures are located so as to be longitudinally aligned with the openings in the outer housing when the bait cartridge is properly installed in the outer housing.

3. The device of claim 1, wherein the bait cartridge includes a plurality of the apertures circumferentially spaced apart about a circumference of the bait cartridge.

4. The device of claim 3, wherein the outer housing includes a plurality of the openings circumferentially spaced apart about a circumference of the outer housing, the openings and the apertures being structured and arranged such that the apertures are circumferentially at least partially aligned with the openings in any rotational orientation of the bait cartridge relative to the outer housing.

5. The device of claim 1, wherein the bait cartridge includes a plurality of the apertures longitudinally spaced apart along and circumferentially spaced apart about the bait cartridge, and the outer housing includes a plurality of the openings longitudinally spaced apart along and circumferentially spaced apart about the outer housing.

6. The device of claim 1, wherein the ribs of each opposed pair project from upper and lower edges of one of the apertures.

7. The device of claim 1, wherein the bait cartridge includes a viewing window through which the interior of the bait cartridge can be viewed to monitor how much termite-edible material remains in the bait cartridge.

8. The device of claim 7, wherein the viewing window comprises a solid portion of the tubular side wall in which no apertures are formed, the bait cartridge being constructed of substantially transparent material.

9. The device of claim 8, wherein the solid portion of the tubular side wall of the bait cartridge that forms the viewing window is provided with a smoother surface finish than other portions of the bait cartridge so as to enhance transparency of the viewing window.

10. The device of claim 1, wherein the bait cartridge is formed of food-grade polyethylene.

11. The device of claim 1, wherein each aperture in the bait cartridge has a width of about 2–3 mm and a length of about 25 mm.

12. The device of claim 1, wherein the ribs of each opposed pair are longitudinally spaced apart by a distance of about 2–3 mm.

13. The device of claim 1, wherein the bait cartridge is generally circular in cross-section and has a diameter of approximately 35–40 mm, and has four longitudinally extending rows of apertures approximately equally spaced about a circumference of the bait cartridge, each row having apertures longitudinally spaced apart about 8 mm on center.

14. The device of claim 13, wherein the ribs have a radial extent of about 2 mm.

15. The device of claim 1, wherein the bait cartridge has a closed lower end and an open upper end, and a cap removably engageable with the open upper end of the bait cartridge.

16. The device of claim 15, wherein the cap and bait cartridge have complementary locking members that engage each other upon engagement of the cap with the upper end of the bait cartridge to retain the cap in place.

17. The device of claim 15, wherein the cap includes an upwardly projecting handle.

18. A termite bait cartridge for insertion into a tubular outer housing implanted in the ground, the bait cartridge being adapted to contain termite-edible material, and comprising:

a tubular side wall extending from a lower end to an upper end thereof;

a bottom wall joined to the lower end of the tubular side wall to close the lower end;

a plurality of circumferentially elongate apertures formed through the tubular side wall to allow termites to access an interior of the bait cartridge, each aperture having an upper edge, a lower edge, and two opposite end edges; and a circumferentially extending upper rib protruding from the upper edge of each aperture radially outwardly beyond an outer surface of the tubular side wall and a circumferentially extending lower rib protruding from the lower edge of each aperture radially outwardly beyond the outer surface of the tubular side wall, the ribs reducing a gap that must be traversed by a termite passing from the outer housing to the bait cartridge and also forming circumferentially extending channels for producing a channeling effect tending to lead termites into the apertures, and wherein the end edges of the apertures are free of any radially outward protrusions so as not to disrupt the channeling effect of the ribs.

19. The bait cartridge of claim 18, wherein the bait cartridge includes a viewing window through which the interior of the bait cartridge can be viewed to monitor how much termite-edible material remains in the bait cartridge.

20. The bait cartridge of claim 19, wherein the viewing window comprises a solid portion of the tubular side wall in which no apertures are formed, the bait cartridge being constructed of substantially transparent material.

21. The bait cartridge of claim 20, wherein the solid portion of the tubular side wall of the bait cartridge that forms the viewing window is polished to have a smoother surface finish than other portions of the bait cartridge.

22. The bait cartridge of claim 18, wherein the bait cartridge is formed of food-grade polyethylene.

23. The bait cartridge of claim 18, wherein each aperture in the bait cartridge has a width of about 2–3 mm and a length of about 25 mm.

24. The bait cartridge of claim 18, wherein the upper and lower ribs of each aperture are longitudinally spaced apart about 2–3 mm.

25. The bait cartridge of claim 18, wherein the bait cartridge is generally circular in cross-section and has a diameter of approximately 35–40 mm, and has a plurality of longitudinally extending rows of apertures approximately equally spaced about a circumference of the bait cartridge, each row having apertures longitudinally spaced apart.

26. The bait cartridge of claim 18, wherein the ribs have a radial extent of about 2 mm.

27. The bait cartridge of claim 18, wherein the upper end of the tubular side wall is open and the bait cartridge includes a cap removably engageable with the open upper end of the tubular side wall.

28. The bait cartridge of claim 27, wherein the cap and tubular side wall have complementary locking members that engage each other upon engagement of the cap with the upper end of the tubular side wall to retain the cap in place.

29. The bait cartridge of claim 27, wherein the cap includes an upwardly projecting handle.

* * * * *